United States Patent
Zhang et al.

(10) Patent No.: US 9,917,670 B1
(45) Date of Patent: Mar. 13, 2018

(54) DC CORRECTION IN UPLINK MULTI-USER TRANSMISSION

(71) Applicant: Marvell International Ltd., Hamilton (BM)

(72) Inventors: Hongyuan Zhang, Fremont, CA (US); Rui Cao, Fremont, CA (US)

(73) Assignee: Marvell International Ltd., Hamilton (BM)

(*) Notice: Subject to any disclaimer, the term of this patent is extended or adjusted under 35 U.S.C. 154(b) by 90 days.

(21) Appl. No.: 15/041,834

(22) Filed: Feb. 11, 2016

Related U.S. Application Data (60) Provisional application No. 62/114,784, filed on Feb. 11, 2015.

(51) Int. Cl.
| | |
|---|---|
| *H04J 11/00* | (2006.01) |
| *H04B 7/0452* | (2017.01) |
| *H04L 5/00* | (2006.01) |
| *H04W 72/04* | (2009.01) |

(52) U.S. Cl.
CPC .......... *H04J 11/003* (2013.01); *H04B 7/0452* (2013.01); *H04L 5/0023* (2013.01); *H04W 72/0413* (2013.01)

(58) Field of Classification Search
CPC . H04J 11/003; H04W 72/0413; H04L 5/0023; H04B 7/0452
See application file for complete search history.

(56) References Cited

U.S. PATENT DOCUMENTS

| | | | | |
|---|---|---|---|---|
| 7,313,376 B1 * | 12/2007 | Hietala | ..................... | H04B 1/30 375/345 |
| 8,571,010 B1 | 10/2013 | Zhang et al. | | |
| 2005/0085249 A1 * | 4/2005 | Goldstein | ........... | H04L 27/2679 455/502 |
| 2007/0004337 A1 * | 1/2007 | Biswas | ............... | H04L 25/0204 455/63.1 |
| 2010/0331032 A1 * | 12/2010 | Lipka | ................ | H04W 56/0035 455/509 |
| 2011/0194655 A1 * | 8/2011 | Sampath | ............. | H04L 27/0014 375/341 |
| 2013/0229996 A1 * | 9/2013 | Wang | ................ | H04W 72/0413 370/329 |

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Hashim Bhatti (57) ABSTRACT

A communication device receives a trigger frame from an access point, the trigger frame configured to prompt the communication device to simultaneously transmit with one or more other communication devices as part of a multi-user uplink transmission. The communication device determines carrier frequency offset (CFO) information based on the trigger frame, and transmits the CFO information to the access point in response to the trigger frame so that the access point can use the CFO to process the multi-user uplink transmission.

26 Claims, 5 Drawing Sheets

(56) References Cited

U.S. PATENT DOCUMENTS

| | | | |
|---|---|---|---|
| 2013/0315211 A1* | 11/2013 | Balan | H04B 7/0697 |
| | | | 370/336 |
| 2015/0023335 A1* | 1/2015 | Vermani | H04B 7/0452 |
| | | | 370/338 |
| 2015/0131517 A1 | 5/2015 | Chu et al. | |
| 2015/0181546 A1* | 6/2015 | Freda | H04W 56/0015 |
| | | | 370/336 |
| 2015/0341861 A1* | 11/2015 | Chung | H04W 4/008 |
| | | | 370/311 |

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

U.S. Appl. No. 14/667,448, Cao et al., "Carrier Frequency Offset Estimation," filed Mar. 24, 2015.

\* cited by examiner

DC CORRECTION IN UPLINK MULTI-USER TRANSMISSION

CROSS-REFERENCE TO RELATED APPLICATIONS

This application claims the benefit of U.S. Provisional Patent Application No. 62/114,784, entitled "DC Correction in Uplink Multi-User Transmission in WLAN," filed on Feb. 11, 2015, the disclosure of which is incorporated herein by reference in its entirety.

FIELD OF THE DISCLOSURE

The present disclosure relates generally to communication networks and, more particularly, to wireless local area networks that use multi-user multiple input, multiple output (MIMO) techniques.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

Some WLANs are capable of operating in both a single-user mode and a multi-user mode. In the single-user mode, an access point (AP) transmits/receives information to/from one client station at a time. In the multi-user mode, the AP simultaneously transmits or receives independent information to/from multiple respective client stations.

SUMMARY

In an embodiment, a method includes: generating a trigger frame at a wireless network interface of a first communication device, the trigger frame being configured to prompt a plurality of second communication devices to simultaneously transmit a multi-user data unit; transmitting, with the wireless network interface, the trigger frame to the plurality of second communication devices; receiving, at the wireless network interface, carrier frequency offset information from the plurality of second communication devices, the carrier frequency offset information having been determined by the plurality of second communication devices and transmitted by the plurality of second communication devices in response to the trigger frame; and using the carrier offset information received from the plurality of second communication devices to correct, at the wireless network interface, for direct current (DC) leakage tones in the multi-user data unit transmitted by the plurality of second communication devices.

In another embodiment, a first communication device comprises a wireless network interface having one or more integrated circuits. The one or more integrated circuits are configured to: generate a trigger frame that is configured to prompt a plurality of second communication devices to simultaneously transmit a multi-user data unit; transmit the trigger frame to the plurality of second communication devices; receive, from the plurality of second communication devices, carrier frequency offset information, the carrier frequency offset information having been determined by the plurality of second communication devices and transmitted by the plurality of second communication devices in response to the trigger frame; and use the carrier offset information received from the plurality of second communication devices to correct for direct current (DC) leakage tones in the multi-user data unit transmitted by the plurality of second communication devices.

In yet another embodiment, a method includes: receiving, at a communication device, a trigger frame from an access point, the trigger frame configured to prompt the communication device to simultaneously transmit with one or more other communication devices as part of a multi-user uplink transmission; determining, at the communication device, carrier frequency offset information based on the trigger frame; and transmitting, with the communication device, the carrier frequency offset information to the access point in response to the trigger frame.

In still another embodiment, a communication device comprises a wireless network interface having one or more integrated circuits. The one or more integrated circuits are configured to: receive a trigger frame from an access point, the trigger frame configured to prompt the communication device to simultaneously transmit with one or more other communication devices as part of a multi-user uplink transmission; determine carrier frequency offset information based on the trigger frame; and cause the wireless network interface to transmit the carrier frequency offset information to the access point in response to the trigger frame.

DETAILED DESCRIPTION

Various embodiments of methods and apparatuses described below involve client stations of a wireless network notifying an access point (AP) of information regarding respective carrier frequency offsets (CFOs) of the client stations. In some embodiments, AP uses the CFO information to mitigate impairments in a multi-user transmission from the client stations resulting from direct current (DC) leakage associated with the CFOs.

Figure 1:
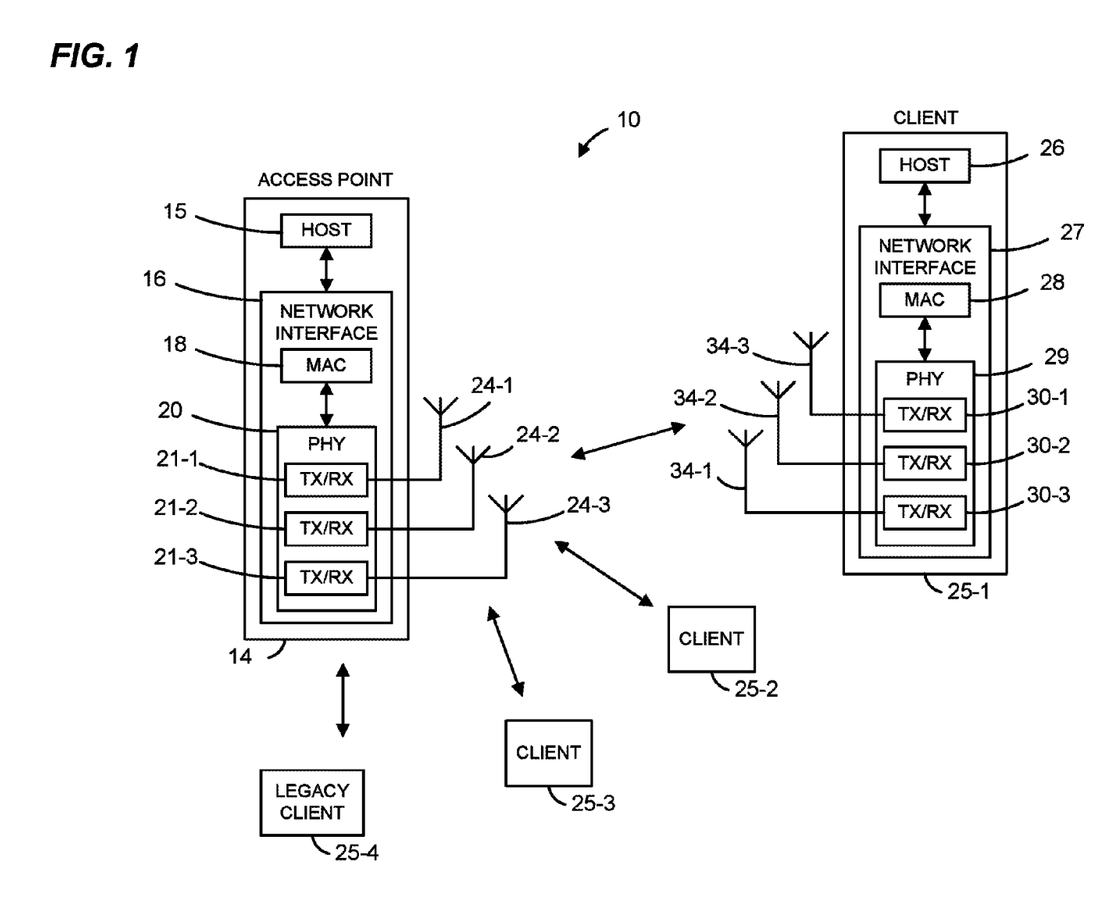
FIG. 1 is a block diagram of an example local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11 ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MAC protocol data units (MPDUs), MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

Figure 2A:
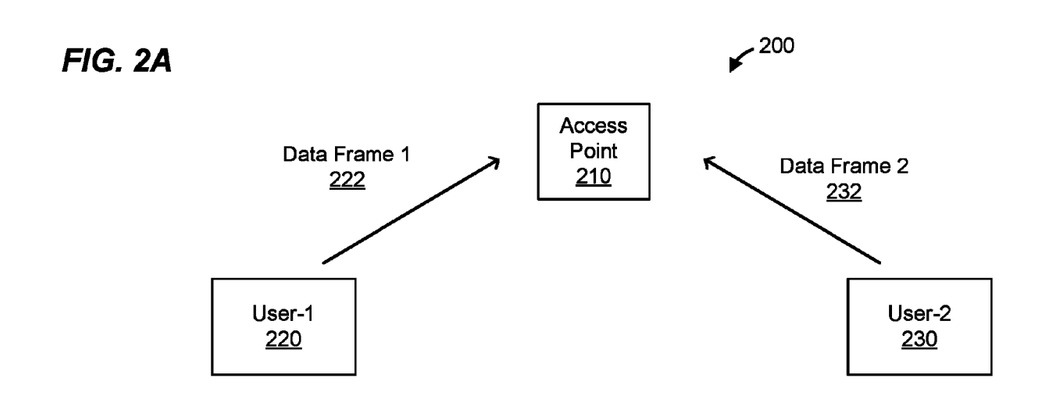
FIG. 2A is a diagram of example simultaneous uplink transmissions in a WLAN 200, according to an embodiment.

In multi-user uplink transmissions, multiple client stations simultaneously transmit uplink data using techniques such as Multi-User Multiple Input, Multiple Output (MU-MIMO), orthogonal frequency division multiple access (OFDMA), etc. FIG. 2A is a diagram of example multi-user uplink transmissions in a WLAN 200, according to an embodiment. The WLAN 200 includes an access point 210 that receives a plurality of data frames transmitted simultaneously from respective ones of a plurality of second communication devices via a multiple-input, multiple output (MIMO) communication channel. The plurality of data frames form a multi-user uplink transmission. In the embodiment shown in FIG. 2, the plurality of second communication devices includes a first client station 220 (User-1) and a second client station 230 (User-2). While only two client stations are illustrated for clarity, the plurality of second communication devices can include additional client stations simultaneously transmitting other data frames as part of the multi-user uplink transmission, in other embodiments and/or scenarios.

In the embodiment shown in FIG. 2A, the plurality of data frames includes a first data frame 222, transmitted by the first client station 220, and a second data frame 232, transmitted by the second client station 230. Although the first client station 220 and second client station 230 transmit the corresponding data frames simultaneously, each data frame may be transmitted with a different device carrier frequency offset (CFO), timing offset, channel fading, or other transmission characteristics that are specific to the corresponding client station (i.e., due to variations in the transceiver 30 and/or antenna 34) and/or to the corresponding communication channel (e.g., between the corresponding client station and the AP).

Figure 2B:
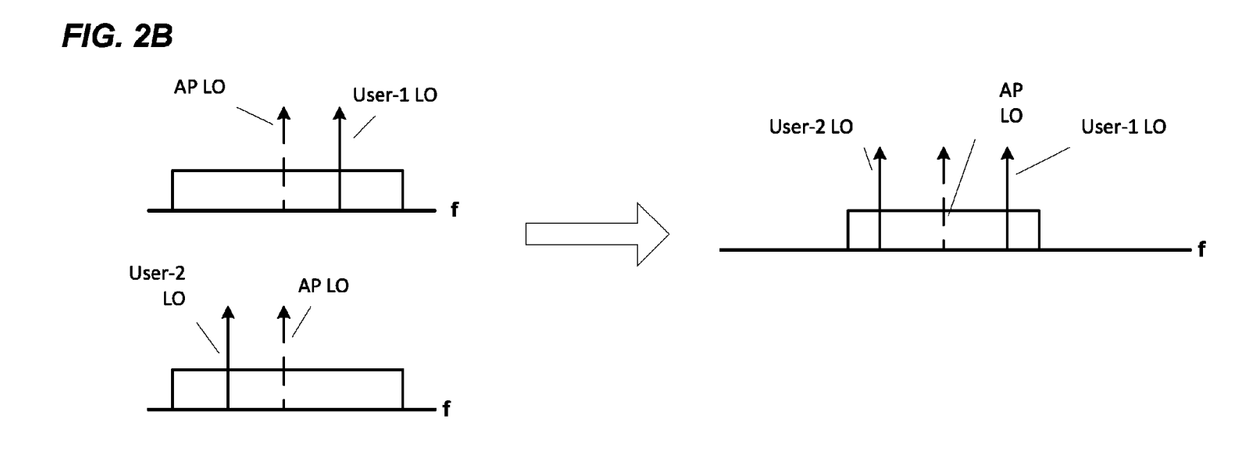
FIG. 2B is a diagram of example signal deterioration due to DC leakage at the local oscillator in a simultaneous multi-user uplink transmission, according to an embodiment.

Typically, in a simultaneous multi-user uplink transmission, performance is impaired by carrier frequency offsets (CFOs) between each client station and the AP. Each client station can perform digital CFO compensation when transmitting to mitigate the effects of the respective CFO. However, a respective local oscillator (LO) of each client station will typically introduce power leakage onto a respective direct current (DC) tone relative to a carrier frequency corresponding to the LO (sometimes referred to herein as a "DC leakage tone"). At the AP, these DC leakage tones appear offset to the carrier frequency and thus may overlap with data tones. The DC leakage tones impair the signal quality on OFDM data tones on which the DC leakage tones appear. FIG. 2B shows a diagram of example signal deterioration due to DC leakage tones in a multi-user uplink transmission illustrated in FIG. 2A, according to an embodiment. The left side of FIG. 2B shows individual transmissions of client station 220 and client station 230. The right side of FIG. 2B shows the transmissions of client station 220 and client station 230 as received at the AP 210. The data frame 222 from client station 220 (User-1) has a first CFO value relative to a LO of the AP, which causes a first DC leakage tone. Similarly, the data frame 232 from the client station 230 (User-2) has a second CFO value relative to the LO of the AP, which causes a second DC leakage tone. As illustrated in FIG. 2B, at the AP, the first DC leakage tone and the second DC leakage tone overlap with data tones of the received multi-user uplink. Due to the DC leakage tones, the received signal quality at the corresponding data tones may have a very low signal to noise ratio.

Figure 3:
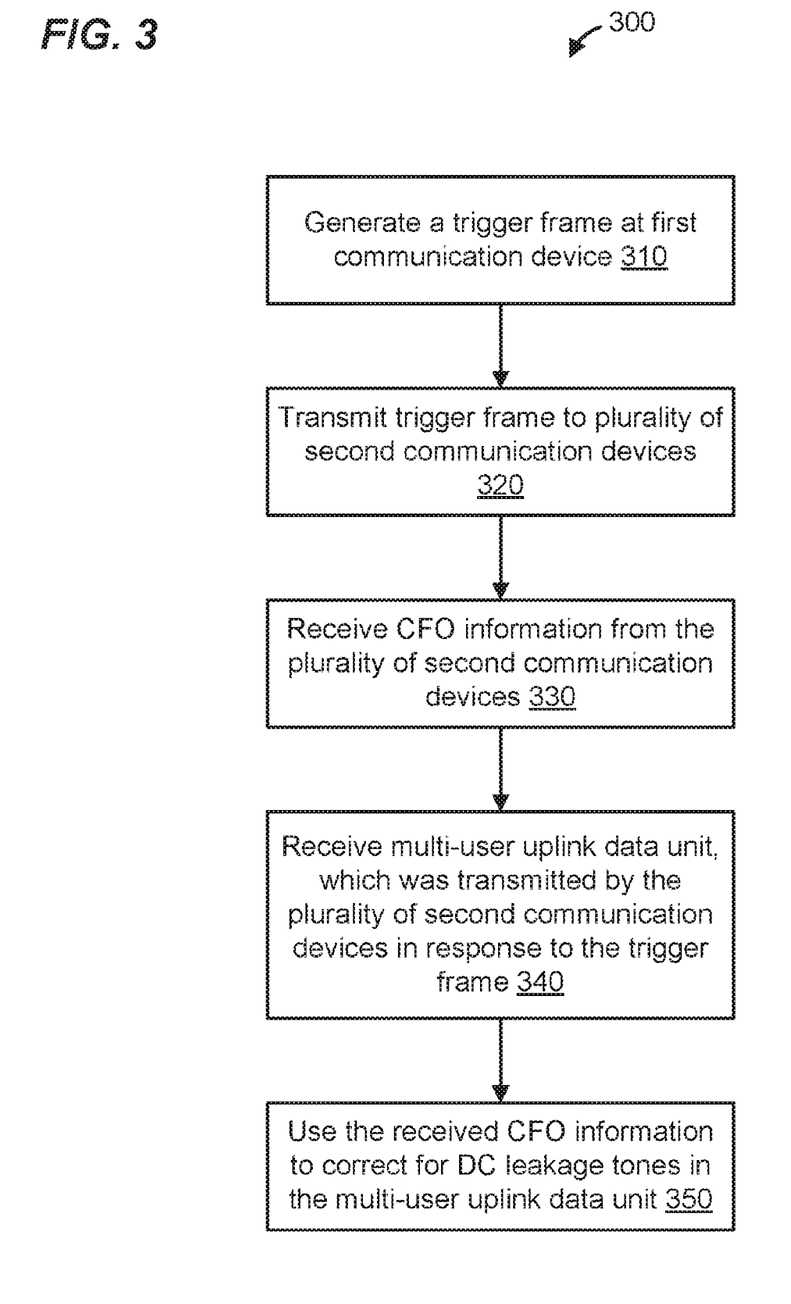
FIG. 3 is a flow diagram of an example method 300 for performing DC correction techniques on the DC tones with power leakage, according to an embodiment.

FIG. 3 is a flow diagram of an example method 300 for performing leakage data exchange, according to an embodiment. In an embodiment, the network interface device 16 (FIG. 1) and/or the access point 210 (FIG. 2) are configured to implement the method 300, and FIG. 3 is described with reference to FIGS. 1 and 2 merely for explanatory purposes. In other embodiments, another suitable communication device is configured to implement the method 300.

At block 310, a first communication device (for example, the network interface device 16, the AP 210, etc.) generates a trigger frame that is configured to prompt a plurality of second communication devices (for example, client stations 25, client stations 220 and 230, etc.) to simultaneously transmit a multi-user data unit to the first communication device.

At block 320, the first communication device transmits the trigger frame to the plurality of second communication devices.

At block 330, the first communication device receives respective CFO information from the plurality of second communication devices. For instance, second communication devices among the plurality of second communication devices (for instance, client stations 25, client stations 220 and 230, etc.) determine respective CFO information, for example, in response to receiving the trigger frame. In an embodiment, the first communication device receives the respective CFO information in a PHY preamble of a multi-user transmission transmitted in response to the trigger frame transmitted at (block 320). In another embodiment, the first communication device receives the respective CFO information in respective single-user transmissions from respective second communication devices, where the single-user transmissions are separate from the multi-user transmission transmitted in response to the trigger frame (transmitted at block 320).

At block 340, the first communication device receives the multi-user data unit, which was transmitted by the plurality of second communication devices in response to the trigger frame, which was transmitted at block 320.

At block 350, the first communication device uses the CFO information (received at block 330) to mitigate DC leakage tones in the multi-user data unit received at block 340.

In various embodiments, the carrier frequency offset information for a respective second communication device includes a magnitude of a respective carrier frequency offset and a sign of the respective carrier frequency offset. In other embodiments, the carrier frequency offset information for a respective second communication device includes a sign of the respective carrier frequency offset, but does not include a magnitude of a respective carrier frequency offset.

In some embodiments, the first communication device compensates for DC leakage tones by marking data in particular tones (e.g., corresponding to DC leakage tones) as erasures for purposes of decoding data in the multi-user uplink data unit. For example, in some embodiments in which the CFO information includes both magnitude information and sign information, the first communication device may use the CFO information to determine one or more tones at which DC leakage is occurring, and then marking data corresponding to the determined one or more tones as erasures for purposes of decoding data in the multi-user uplink data unit.

In other embodiments in which the CFO information includes sign information but does not include magnitude information, the first communication device determines whether all of the sign information for all of the second communication devices corresponds to a same sign. In response to determining that all of the sign information for all of the second communication devices corresponds to the same sign, the first communication device marks data corresponding to a range of DC tones in the multi-user uplink data unit as erasures, where the range of DC tones corresponds to DC tones only on one side of the tone corresponding to the carrier frequency, and where the one side corresponds to the sign of the CFOs. In an embodiment, the range corresponds to a known accuracy requirement of LOs in the second communication devices. For example, in an embodiment, the first communication protocol defines the accuracy requirement. For instance, the IEEE 802.11ac Standard requires an LO accuracy range of +20 ppm. Thus, in an illustrative embodiment in which the known accuracy requirement of LOs is −20 ppm, the range spans tones corresponding to a variation in the LO of up to 20 ppm.

In response to determining that all of the sign information for all of the second communication devices does not correspond to the same sign, the first communication device marks data corresponding to a range of DC tones in the multi-user uplink data unit as erasures, where the range of DC tones corresponds to DC tones on both sides of the tone corresponding to the carrier frequency. In an embodiment, the range corresponds to a known accuracy requirement of LOs in the second communication devices. For example, in an embodiment, the first communication protocol defines the accuracy requirement. For instance, the IEEE 802.11 ac Standard requires an LO accuracy range of ±20 ppm. Thus, in an illustrative embodiment in which the known accuracy requirement of LOs is ±20 ppm, the range spans tones corresponding to a variation in the LO of up to 40 ppm (e.g., 20 ppm below the carrier frequency and 20 ppm above the carrier frequency).

In some embodiments in which the CFO information includes both magnitude information and sign information, the first communication device determines a DC leakage frequency for the respective second communication device using the carrier frequency offset information for the respective second communication device. The first communication device may then estimate a respective DC leakage power at the determined respective DC leakage frequency using, for example, a training field in a PHY preamble of the multi-user data unit. In an embodiment, the DC leakage power is estimated using a low pass filter applied to the training field in the PHY preamble of the multi-user data unit. In an embodiment, the first communication device removes the leakage power from OFDM symbols subsequent to the training field in the multi-user data unit.

In an embodiment, the respective signal power on the respective DC leakage frequency (fu) of the respective second communication device is estimated according to:

$$P(u) = \text{filter}_u(r_{STF}(t)), u = 1, 2, \ldots, U, \qquad \text{Equation 1}$$

where u is an index indicating a particular second communication device, P(u) is a DC leakage power for the u-th second communication device, $\text{filter}_u$ is a low-pass filter corresponding to the u-th second communication device, $r_{STF}(t)$ is a received signal corresponding to a legacy short training field (L-STF) in the multi-user uplink data unit, and U is a total number of second communication devices. In an embodiment, the DC leakage power may be removed in time-domain from OFDM symbols that are subsequent to the L-STF field according to:

$$\hat{r}(t) = r(t) - \sum_{u=1}^{U} P(u) \cdot e^{j \cdot f_u t} \qquad \text{Equation 2}$$

where r(t) is the received multi-user uplink signal, and $\hat{r}(t)$ is a compensated signal, sometimes referred to herein as a DC corrected signal. The first communication device may further process the DC corrected signal to, for example, decode data included in the multi-user uplink data unit.

Figure 4A:
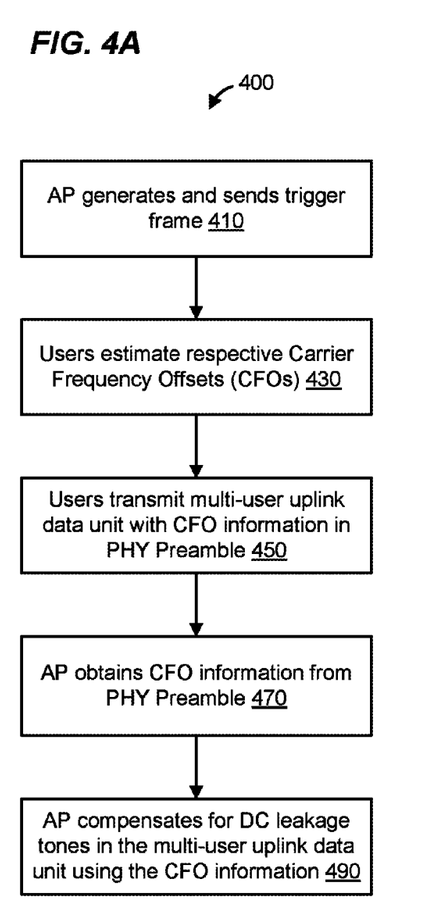
FIG. 4A is a flow diagram of an example method for performing DC correction techniques, according to an embodiment.
Figure 4B:
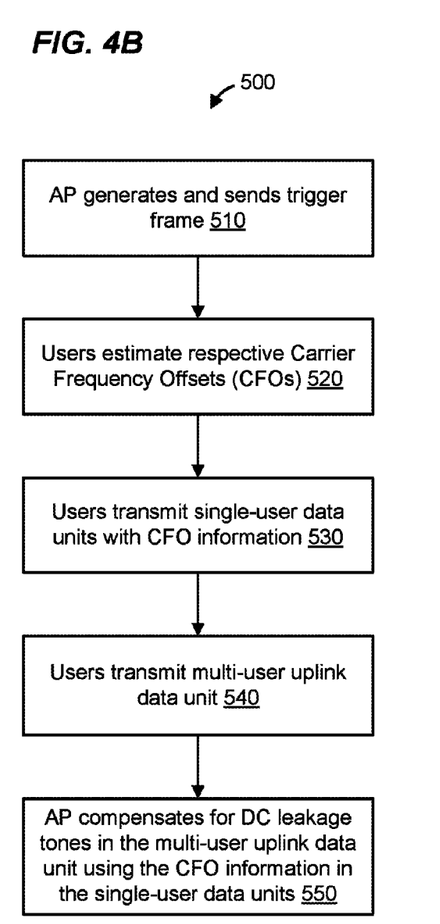
FIG. 4B is a flow diagram of an example method for performing DC correction techniques, according to another embodiment.

FIGS. 4A and 4B are flow diagrams of example methods related to multi-user uplink transmissions, according to two embodiments. In various embodiments, communication devices illustrated in FIGS. 1 and 2 are configured to implement the methods illustrated in FIGS. 4A and 4B, and FIGS. 4A and 4B are discussed with reference to FIGS. 1 and 2 merely for explanatory purposes. In other embodiments, however, other suitable communication devices are configured to implement the methods of FIGS. 4A and 4B.

Referring now to FIG. 4A, at block 410, an AP generates and transmits a trigger frame to a plurality of second communication devices. The trigger frame is configured to prompt the plurality of second communication devices to transmit a multi-user uplink data unit, in an embodiment. At block 430, the second communication devices estimate respective CFOs based on the trigger frame transmitted at block 410.

At block 450, the second communication devices transmit the multi-user data unit to the AP in response to the trigger frame transmitted at block 410. In an embodiment, the second communication devices include the CFO information estimated at block 430 within a PHY preamble of the multi-user data unit, in an embodiment. For example, in an embodiment, each second communication device includes the respective CFO information in a respective portion of the PHY preamble. For instance, in an embodiment, each second communication device includes the respective CFO information in a respective portion of a first high efficiency signal field (HE-SIGA). As another example, each second communication device includes the respective CFO information in a respective portion of a second high efficiency signal field (HE-SIGB). In other embodiments, each second communication device includes the respective CFO information in a respective portion of another suitable field (or in a suitable respective field) within the PHY preamble.

At block 470, the AP receives the multi-user uplink data unit transmitted by the second communication devices, and obtains the CFO information in the PHY preamble. For example, in an embodiment, the AP obtains the CFO information from the HE-SIGA field. As another example, in an embodiment, the AP obtains the CFO information from the HE-SIGB field. In other embodiments, the AP obtains the CFO information from one or more other suitable fields in the PHY preamble of the multi-user uplink data unit. At block 490, the AP uses the received CFO information to compensate for DC leakage tones in OFDM symbols in the multi-user uplink data unit that occur after the PHY preamble. In some embodiments, the AP also uses the received CFO information to compensate for DC leakage tones in at least some OFDM symbols in the PHY preamble that occur after the one or more fields that include the CFO information.

Referring now to FIG. 4B, at block 510, an AP generates and transmits a trigger frame to a plurality of second communication devices. The trigger frame is configured to prompt the plurality of second communication devices to transmit a multi-user uplink data unit, in an embodiment. At block 520, the second communication devices estimate respective CFOs based on the trigger frame transmitted at block 510.

At block 530, the second communication devices transmit respective single user data units to the AP in response to the trigger frame transmitted at block 510. Each second communication device includes the respective CFO information estimated at block 520 within the single-user data unit. In some embodiments, the single-user data units transmitted at block 530 utilize a short data unit format, wherein the short data unit format corresponds to shorter data units as compared to a regular data unit format. For instance, in some embodiments, a PHY preamble format of the short data unit format has a shorter length as compared to a PHY preamble format of the regular data unit format (e.g., the short PHY preamble format omits one or more fields included in the regular PHY preamble format). In some embodiments, a MAC header format of the short data unit format has a shorter length as compared to a MAC header format of the regular data unit format (e.g., the short MAC header format omits one or more fields included in the regular MAC header format).

In an embodiment, each second communication device includes the respective CFO information in a PHY preamble of the respective single-user data unit. For instance, in an embodiment, each second communication device includes the respective CFO information in a HE-SIGA field of the PHY preamble of the respective single-user data unit. As another example, each second communication device includes the respective CFO information in a HE-SIGB field of the PHY preamble of the respective single-user data unit. In other embodiments, each second communication device includes the respective CFO information in another suitable field of the PHY preamble of the respective single-user data unit.

In an embodiment, each second communication device includes the respective CFO information in a MAC header of the respective single-user data unit. In an embodiment, each second communication device includes the respective CFO information in a data portion of an MPDU in the respective single-user data unit.

At block 540, the second communication devices transmit the multi-user data unit to the AP in response to the trigger frame transmitted at block 510.

At block 550, the AP receives the multi-user uplink data unit transmitted by the second communication devices. Also at block 550, the AP uses the CFO information (received via the single-user data units (block 530) to compensate for DC leakage tones in OFDM symbols in the multi-user uplink data unit.

Figure 5:
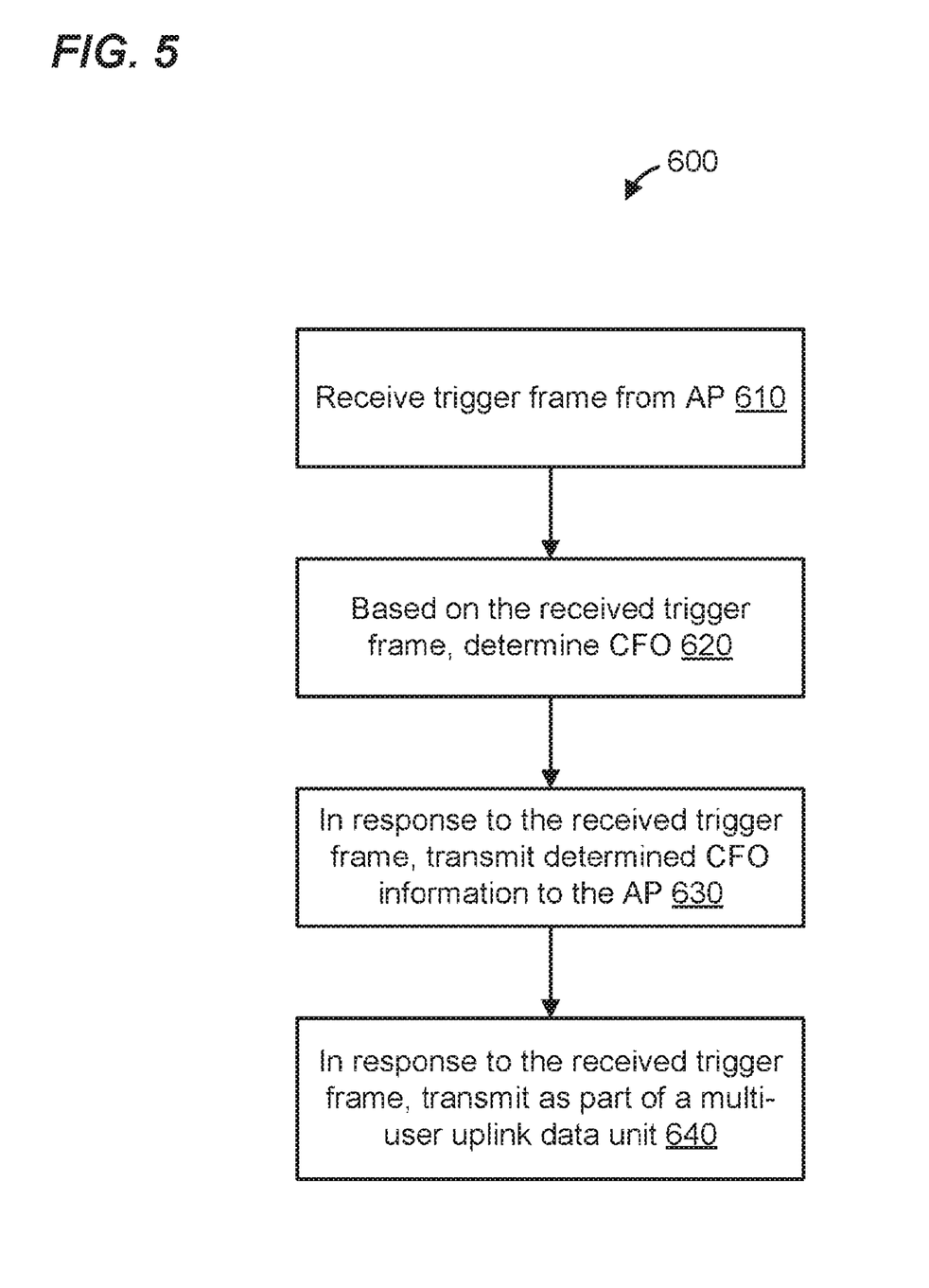
FIG. 5 is a flow diagram of an example method 300 for performing DC correction techniques on the DC tones with power leakage, according to another embodiment.

FIG. 5 is a flow diagram of an example method 600 for performing a multi-user uplink transmission, according to an embodiment. In an embodiment, the network interface device 27 (FIG. 1), the communication device 220 (FIG. 2), and/or the communication device 230 (FIG. 2) are configured to perform the method 600, and FIG. 5 is discussed with reference to FIGS. 1 and 2 merely for explanatory purposes. In other embodiments, another suitable communication device (e.g., a suitable wireless network interface device) is configured to implement the method 600.

At block 610, a communication device receives a trigger frame from an AP, where the trigger frame is configured to prompt the communication device to simultaneously transmit with one or more other communication devices as part of a multi-user uplink transmission.

At block 620, the communication device determines (e.g., estimates), based on the trigger frame, a carrier frequency offset (CFO) information regarding a CFO of the communication device relative to a carrier frequency utilized by the AP. In an embodiment, manufacturing variations in a LO of the communication device result in at least some of the CFO. In an embodiment, the communication device determines the CFO information the LO of the AP using known methods.

In an embodiment, the communication device determines the CFO information using a suitable technique, such as a suitable technique currently known to those of skill in the art or later-developed suitable technique. As merely an illustrative example, the communication device uses a technique for determining CFO information described in U.S. application Ser. No. 14/667,448, entitled "Carrier Frequency Offset Estimation," filed on Mar. 24, 2015, which is hereby incorporated by reference in its entirety.

At block 630, the communication device transmits the CFO information to the AP in response to the trigger frame received at block 610. As discussed above, in some embodiments, the CFO information includes both magnitude information and sign information. In other embodiments, the CFO information includes sign information but does not include magnitude information.

As discussed above, in some embodiments, the communication device includes the CFO information in a single-user data unit and transmits the single-user data unit to the AP in response to the trigger frame received at block 610. Also as discussed above, in some embodiments, the communication device includes the CFO information in a PHY preamble of a transmission corresponding to the multi-user uplink transmission to the AP, which is responsive to the trigger frame received at block 610.

At block 640, the communication device transmits simultaneously with one or more other communication devices as part of a multi-user uplink transmission responsive to the trigger frame received at block 610. In an embodiment, the transmission of the communication device at block 640 and the simultaneously transmission(s) of the one or more other communication devices form a multi-user uplink data unit that is received at the AP. In some embodiments, the communication device includes the CFO information generated at block 620 in a PHY preamble of the transmission of block 640. Thus, in some embodiments, block 630 is an element of block 640.

In another embodiment, a method comprises: generating a trigger frame at a wireless network interface of a first communication device, the trigger frame being configured to prompt a plurality of second communication devices to simultaneously transmit a multi-user data unit; transmitting the trigger frame to the plurality of second communication devices; receiving, from the plurality of second communication devices, carrier frequency offset information, the carrier frequency offset information having been determined by the plurality of second communication devices and transmitted by the plurality of second communication devices in response to the trigger frame; and using the carrier offset information received from the plurality of second communication devices to correct for direct current (DC) leakage tones in the multi-user data unit transmitted by the plurality of second communication devices.

In an embodiment, a network interface device includes one or more ICs configured to carry out at least some of the acts recited in the previous paragraph.

In still another embodiment, a method comprises: receiving a trigger frame at a wireless network interface from an access point, the trigger frame configured to prompt the communication device to simultaneously transmit with one or more other communication devices to generate a multi-user data unit; based on the trigger frame, determining a carrier frequency offset; and in response to the trigger frame, transmitting carrier frequency offset information to the access point.

In an embodiment, a network interface device includes one or more ICs configured to carry out at least some of the acts recited in the previous paragraph.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium, or media, such as a magnetic disk, an optical disk, a magnetic tape, a RAM, or a ROM, a flash memory, a memory of a processor, etc. The software or firmware instructions include machine readable instructions that, when executed by one or more processors, cause the one or more processors to perform various acts.

When implemented in hardware, the hardware may comprise one or more of discrete components, a custom integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method comprising:
generating a trigger frame at a wireless network interface of a first communication device, the trigger frame being configured to prompt a plurality of second communication devices to simultaneously transmit in connection with a multi-user transmission;
transmitting, by the wireless network interface, the trigger frame to the plurality of second communication devices;
receiving, at the wireless network interface, carrier frequency offset information from the plurality of second communication devices, the carrier frequency offset information having been determined by the plurality of second communication devices and transmitted by the plurality of second communication devices in response to the trigger frame; and
using the carrier offset information received from the plurality of second communication devices to correct, at the wireless network interface, for direct current (DC) leakage tones in the multi-user transmission transmitted by the plurality of second communication devices.

2. The method of claim 1, wherein the carrier frequency offset information is included in the multi-user transmission transmitted by the plurality of second communication devices.

3. The method of claim 2, wherein the carrier frequency offset information is included in a physical layer preamble of the multi-user transmission transmitted by the plurality of second communication devices.

4. The method of claim 1, wherein the carrier frequency offset information is received at the first communication device in a plurality of single-user uplink data units separate from the multi-user transmission.

5. The method of claim 1, wherein the carrier frequency offset information includes a magnitude of a respective carrier frequency offset and a sign of the respective carrier frequency offset for a respective second communication device.

6. The method of claim 5, further comprising:
determining, at the wireless network interface, respective DC leakage frequencies of respective DC leakage tones of the second communication devices using the carrier frequency offset information;
estimating, at the wireless network interface, respective DC leakage powers at the respective DC leakage frequencies for the second communication devices during reception of a training field in the multi-user transmission; and
subtracting, at the wireless network interface, DC leakage tones from data signals in the multi-user transmission at the DC leakage frequencies based on the respective DC leakage powers.

7. The method of claim 6, wherein estimating respective DC leakage powers comprises using respective low pass filters.

8. The method of claim 1, wherein:
the carrier frequency offset information includes only signs of carrier frequency offsets for the plurality of second communication devices; and
the method further comprises selectively treating, at the wireless network interface, data corresponding to tones centered at the DC leakage tones within an accuracy range of a local oscillator of the first communication device as erasures based on the signs of the carrier frequency offsets.

9. A first communication device, comprising:
a wireless network interface having one or more integrated circuits configured to:
generate a trigger frame that is configured to prompt a plurality of second communication devices to simultaneously transmit in connection with a multi-user data unit transmission,
transmit the trigger frame to the plurality of second communication devices,
receive, from the plurality of second communication devices, carrier frequency offset information, the carrier frequency offset information having been determined by the plurality of second communication devices and transmitted by the plurality of second communication devices in response to the trigger frame, and
use the carrier offset information received from the plurality of second communication devices to correct for direct current (DC) leakage tones in the multiuser transmission transmitted by the plurality of second communication devices.

10. The first communication device of claim 9, wherein:
the carrier frequency offset information is included in the multi-user transmission transmitted by the plurality of second communication devices; and
the one or more integrated circuits configured to obtain the carrier frequency offset information from the multi-user transmission.

11. The first communication device of claim 10, wherein:
the carrier frequency offset information is included in a physical layer preamble of the multi-user transmission transmitted by the plurality of second communication devices; and
the one or more integrated circuits configured to obtain the carrier frequency offset information from the physical layer preamble of the multi-user transmission.

12. The first communication device of claim 9, wherein:
the carrier frequency offset information is received at the first communication device in a plurality of single-user uplink data units separate from the multi-user transmission; and
the one or more integrated circuits configured to obtain the carrier frequency offset information from the plurality of single-user uplink data units.

13. The first communication device of claim 9, wherein the carrier frequency offset information includes a magnitude of a respective carrier frequency offset and a sign of the respective carrier frequency offset for a respective second communication device.

14. The first communication device of claim 13, wherein the one or more integrated circuit devices are configured to:
determine respective DC leakage frequencies of respective DC leakage tones of the second communication devices using the carrier frequency offset information;
estimate respective DC leakage powers at the respective DC leakage frequencies for the second communication devices during reception of a training field in the multi-user transmission; and
subtract DC leakage tones from data signals in the multi-user transmission at the DC leakage frequencies based on the respective DC leakage powers.

15. The first communication device of claim 14, wherein the DC leakage power is estimated using a low pass filter.

16. The first communication device of claim 9, wherein:
the carrier frequency offset information includes only signs of carrier frequency offsets for the plurality of second communication devices; and
the one or more integrated circuits are configured to selectively treat data corresponding to tones centered at the DC leakage tones within an accuracy range of a local oscillator of the first communication device as erasures based on the signs of the carrier frequency offsets.

17. A method comprising:
receiving, at a communication device, a trigger frame from an access point, the trigger frame configured to prompt the communication device to simultaneously transmit with one or more other communication devices as part of a multi-user uplink transmission;
determining, at the communication device, carrier frequency offset information based on the trigger frame; and
transmitting, by the communication device, the carrier frequency offset information to the access point in response to the trigger frame, wherein the carrier offset information is useable, at the access point, to correct for direct current (DC) leakage tones in the multi-user uplink transmission.

18. The method of claim 17, further comprising:
transmitting, by the communication device, simultaneously with the one or more other communication devices as part of the multi-user uplink transmission; and
including, at the communication device, the carrier frequency offset information in a physical layer preamble of the multi-user uplink transmission.

19. The method of claim 17, further comprising:
transmitting, by the communication device, the carrier frequency offset information in a single-user uplink data unit; and
transmitting, with the communication device, simultaneously with the one or more other communication devices as part of the multi-user uplink transmission, wherein the single-user data unit is separate from the multi-user uplink transmission.

20. The method of claim 17, wherein:
determining the carrier frequency offset information includes determining a magnitude of the carrier frequency offset and a sign of the carrier frequency offset; and
transmitting the carrier frequency offset information to the access point includes transmitting the magnitude of the carrier frequency offset and the sign of the carrier frequency offset to the access point.

21. The communication device of claim 17, wherein:
determining the carrier frequency offset information includes determining a sign of the carrier frequency offset; and
transmitting the carrier frequency offset information to the access point includes transmitting the sign of the carrier frequency offset to the access point and not transmitting a magnitude of the carrier frequency offset to the access point.

22. A communication device, comprising:
a wireless network interface having one or more integrated circuits configured to:
receive a trigger frame from an access point, the trigger frame configured to prompt the communication device to simultaneously transmit with one or more other communication devices as part of a multi-user uplink transmission,
determine carrier frequency offset information based on the trigger frame, and
cause the wireless network interface to transmit the carrier frequency offset information to the access point in response to the trigger frame, wherein the carrier offset information is useable, at the access point, to correct for direct current (DC) leakage tones in the multi-user uplink transmission.

23. The communication device of claim 22, wherein the one or more integrated circuits are configured to:
cause the wireless network interface to transmit simultaneously with the one or more other communication devices as part of the multi-user uplink transmission; and
include the carrier frequency offset information in a physical layer preamble of the multi-user uplink transmission.

24. The communication device of claim 22, wherein the one or more integrated circuits are configured to:

cause the wireless network interface to transmit simultaneously with the one or more other communication devices as part of the multi-user uplink transmission; and cause the wireless network interface to transmit the carrier frequency offset information in a single user uplink data unit that is separate from the multi-user uplink transmission.

25. The communication device of claim 22, wherein the one or more integrated circuits are configured to:

determine a magnitude of the carrier frequency offset and a sign of the carrier frequency offset; and cause the wireless network interface to transmit to the access point the magnitude of the carrier frequency offset and the sign of the carrier frequency offset.

26. The communication device of claim 22, wherein the one or more integrated circuits are configured to:

determine a sign of the carrier frequency offset; and cause the wireless network interface to transmit to the access point the sign of the carrier frequency offset and to not transmit to the access point a magnitude of the carrier frequency offset.

\* \* \* \* \*